Oct. 9, 1951  G. WIKKENHAUSER  2,570,738
RADIO LOCATION
Filed May 14, 1945
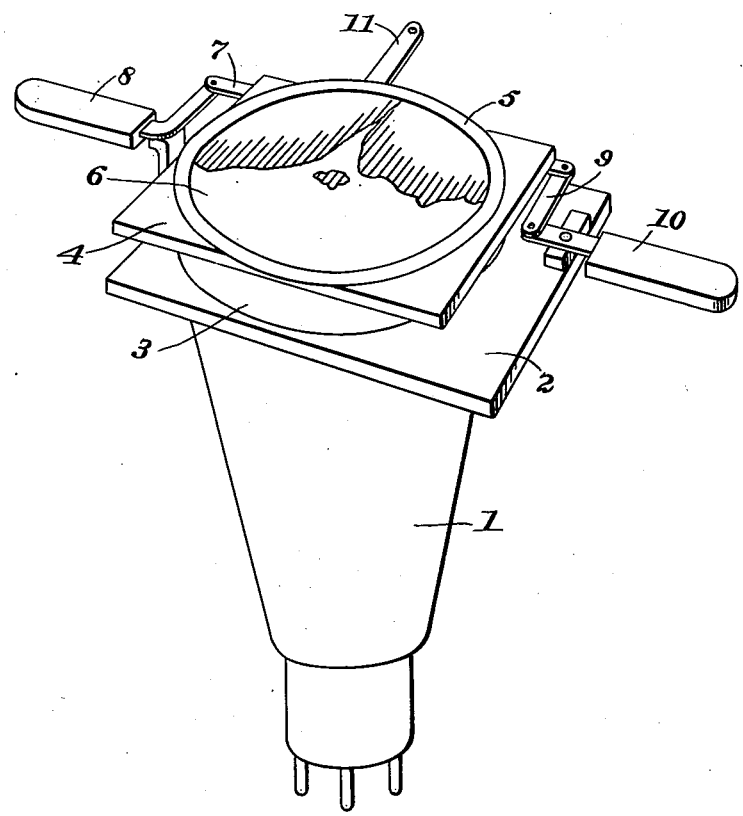
Inventor:
Gustav Wikkenhauser,
By Cushman, Darby & Cushman
Attorneys.

Patented Oct. 9, 1951

2,570,738

UNITED STATES PATENT OFFICE 2,570,738

RADIO LOCATION

Gustav Wikkenhauser, Wells, England, assignor to Scophony Corporation of America, New York, N. Y., a corporation of Delaware Application May 14, 1945, Serial No. 593,646
In Great Britain May 15, 1944

2 Claims. (Cl. 343—11)

This invention relates to radar apparatus of the kind having transmitting means for causing a narrow exploring radio beam, which may be intermittent, to sweep at least a sector, receiving means adapted to pick up signals constituted by reflection of said beam by objects in the area swept thereby, means for obtaining the time-intervals between the instants of transmission of identifiable parts of said beam, e. g. pulses, and the instants of reception of reflections of the respective parts, and means for forming on a screen, marks the distance of which from an origin are directly proportional to said time-intervals and the directions of which from said origin correspond to the directions of transmission of the respective parts of said beam.

An object of this invention is to facilitate the use of apparatus of this kind as a navigational aid.

According to the present invention radar apparatus of the kind specified is provided with supporting means to which a chart can be fixed and adjusting means for moving said supporting means and hence said chart, in its own plane, the arrangement being such that, when employing a chart of the appropriate scale, the said marks can be brought into and maintained in substantial co-incidence with corresponding features upon said chart.

When the apparatus is to be used with transparent or translucent charts the supporting means may serve to support the chart in front of the radar screen. For use with opaque charts, means may be provided for projecting an image of the radar screen upon the chart.

The adjusting means may be operated manually or may comprise means operating automatically in response to a departure from co-incidence between the said marks on the radar screen and the corresponding features on the chart in such a manner as to tend to restore the co-incidence.

One embodiment of the present invention in which manually operable adjusting means are provided is shown in the accompanying drawing. Its use will be described as applied to the navigation of a ship adjacent to a coastline.

The radar equipment on the ship which may be of known type includes a rotatable transmitting aerial adapted to emit a narrow beam in the horizontal plane. This aerial is rotated continuously about a vertical axis while emitting signals in the form of relatively short pulses. The receiver on the ship has a fixed aerial adapted to pick up signals arriving horizontally from all directions. When a part of the coastline, or an object such as another ship or a beacon intervening between the transmitter and the coastline, gives a reflection of a pulse directed towards it by the transmitter, the receiver picks up the reflection, and the apparatus causes a mark to be shown on the indicator screen of an associated cathode ray tube at such a distance from the origin thereon that the ratio of this distance to the distance from the ship to the said reflecting object is the scale of the chart.

The cathode ray tube of the radar equipment described is shown in the drawing at 1 and is mounted beneath an apertured base plate 2. Above the screen 3 of the tube 1 there is provided a platform 4 having an aperture of substantially the same size as the screen 3. Upon the platform 4 is rotatably mounted a frame 5 in which a transparent chart 6 can be fastened. The platform 4 is mounted on a link 7 having one end hinged to a bell-cranked handle 8 and its opposite end coupled by a hinged link 9 to a second handle 10. The handles 8 and 10 are pivotally mounted upon the base plate 2. A handle 11 enables the frame 5 to be rotated upon the platform 4.

The chart 6 is selected to have the same scale as the display on the screen 3 which is determined by the time base signals used to deflect the cathode ray.

The speed of rotation of the transmitting aerial and the after-glow of the screen 3 are arranged to be such that successive marks on the screen form a trace. By manipulation of the handles 8, 10 and 11, this trace can be kept in coincidence with the corresponding features on the chart. The origin, which will usually be the centre of the screen 3, will then represent the varying position of the ship on the chart.

If desired the position of the origin can be indicated for example by a luminous spot on the screen visible through the chart.

The maximum extent of movement of the frame 5 permitted by its mounting can be chosen according to requirements and will usually be greater than that possible with the mechanism shown in the drawing. If desired two tubes 1 may be operated in parallel from the radar equipment so that when owing to movement of the ship it becomes necessary to change the chart the new chart can be fitted to the tube not in use, the chart on the other tube being used in the meantime.

If desired, instead of using transparent or translucent charts, as in the embodiment described, optical means may be provided for forming an image of the traces, including the origin, on the screen 5 on a suitably placed chart which may then be opaque. Means for adjusting the chart are provided as in the example described.

Having now particularly described and ascertained the nature of my said invention and in what manner the same is to be performed, I declare that what I claim is:

1. In combination, a cathode ray tube including a screen, an apertured platform positioned in a plane normal to the axis of said tube and adjacent said screen, a chart frame rotatably mounted in the aperture of said platform, and a light transmitting chart mounted in said frame, said platform being pivotally mounted relative to said tube whereby said rotatably mounted chart may be moved translationally relative to said tube screen in all directions in its own plane.

2. In combination, a cathode ray tube including a screen, an apertured platform positioned in a plane normal to the axis of said tube and adjacent said screen, a chart frame rotatably mounted in the aperture of said platform, a light transmitting chart mounted in said frame, one edge of said platform being pivotally mounted relative to said tube by means of a bell crank and the opposite edge of said platform being pivotally mounted relative to said tube by means of a hinged link, whereby said chart may be rotated relative to said tube screen and moved translationally relative thereto in all directions in its own plane.

GUSTAV WIKKENHAUSER.

REFERENCES CITED

The following references are of record in the file of this patent:

UNITED STATES PATENTS

| Number | Name | Date |
| --- | --- | --- |
| 1,706,185 | Sabbah | Mar. 19, 1929 |
| 2,183,634 | Zworykin | Dec. 19, 1939 |
| 2,209,191 | Dearing | July 23, 1940 |
| 2,214,299 | Heller | Sept. 10, 1940 |
| 2,406,751 | Emerson | Sept. 3, 1946 |
| 2,408,848 | Hammond | Oct. 8, 1946 |
| 2,428,427 | Loughren | Oct. 7, 1947 |

FOREIGN PATENTS

| Number | Country | Date |
| --- | --- | --- |
| 496,129 | Great Britain | Nov. 22, 1938 |
| 856,356 | France | Mar. 18, 1940 |